United States Patent [19]
Morrison, Jr.

[11] Patent Number: 4,913,070
[45] Date of Patent: Apr. 3, 1990

[54] GROUND CONTACT IMPLEMENT SOIL PENETRATION DEPTH CONTROL

[75] Inventor: John E. Morrison, Jr., Temple, Tex.

[73] Assignee: The United States of America as represented by the Secretary of Agriculture, Washington, D.C.

[21] Appl. No.: 319,795

[22] Filed: Mar. 6, 1989

Related U.S. Application Data

[63] Continuation of Ser. No. 179,453, Apr. 8, 1988, abandoned.

[51] Int. Cl.$^4$ .......... A01B 63/111; A01C 5/06
[52] U.S. Cl. .................. 111/135; 111/926; 111/191; 172/4
[58] Field of Search .......... 172/4, 210.5; 111/135, 111/134, 136, 137, 85, 52, 1, 62, 195, 194, 191

[56] References Cited

U.S. PATENT DOCUMENTS

| | | | |
|---|---|---|---|
| 2,621,575 | 12/1952 | Berg | 172/4 |
| 2,782,703 | 2/1957 | Chambers et al. | 111/85 X |
| 3,088,264 | 5/1963 | Saldee | 172/4 X |
| 3,090,333 | 5/1963 | Caha | 111/135 X |
| 3,561,541 | 2/1971 | Woelfel | 172/260.5 |
| 3,658,133 | 4/1972 | Sweet et al. | 172/4 |
| 4,031,963 | 6/1977 | Poggemiller et al. | 172/4 |
| 4,031,966 | 6/1976 | Farrell | 172/260.5 X |
| 4,090,456 | 5/1978 | Morrison, Jr. et al. | 111/3 |
| 4,135,457 | 1/1979 | Willis | 111/52 |
| 4,141,302 | 2/1979 | Morrison, Jr. et al. | 111/52 |
| 4,176,721 | 12/1979 | Poggemiller et al. | 111/85 X |
| 4,275,670 | 6/1981 | Dreyer | 111/85 |
| 4,355,688 | 10/1982 | Hamm et al. | 172/4 |
| 4,506,609 | 3/1985 | Fuss et al. | 111/85 |

FOREIGN PATENT DOCUMENTS 2126062 3/1984 United Kingdom ............... 111/85

OTHER PUBLICATIONS

Morrison, Jr., John E. et al., "Flexible Mounted Double-Discs . . . ", Trans. ASAE, vol. 26, No. 4, pp. 1044-1045, 1983.

Morrison, Jr., John E. et al., "Planter Depth-Control: . . .", Trans. ASAE, vol. 28, No. 5, pp. 1415-1418, 1985.

Morrison, Jr., John E., "No-Tillage Experimental Planter Performance . . .", Trans. ASAE, vol., 21, No. 4, p. 602 onward, 1978.

*Primary Examiner*—Danton D. DeMille
*Attorney, Agent, or Firm*—David R. Sadowski; M. Howard Silverstein

[57] ABSTRACT

Disclosed is an apparatus for controlling the depth of soil penetration of a ground contact implement, such as a planter, furrow opener, seeder, tiller, fertilizer or pesticide applicator, plow, etc. or any combination thereof. The present invention permits presetting of a desired ground contact implement soil penetration depth, and provides continuous dynamic regulating of an adjustable downpressure system in response to changing forces exerted on the device (for example, including those forces resulting from soil unevenness), so as to maintain the ground contact implement at approximately the preset desired depth.

18 Claims, 6 Drawing Sheets

GROUND CONTACT IMPLEMENT SOIL PENETRATION DEPTH CONTROL

This application is a continuation, of application Ser. No. 07/179,453, filed 04/08/88 now abandoned.

BACKGROUND OF THE INVENTION

1. Field of the Invention

The present invention relates to a device for controlling the depth of soil penetration of a ground contact implement (GCI). The invention permits presetting of a desired GCI soil penetration depth, and provides continuous dynamic regulating of an adjustable downpressure system in response to changing forces exerted on the device (e.g. including those forces resulting from soil unevenness) so as to maintain the GCI at approximately the preset desired depth. The present provides GCI position control, rather than simply utilizing hydraulic or pneumatic fluid pressure control, to regulate depth of GCI soil penetration.

2. Description of the Prior Art

Depth controls, for individual furrow opener units on planters and drills, including one or more wheels at either the front, sides or rear of an opener unit, were described by Morrison and Gerik, Trans. ASAE, Vol. 28, No. 5, p. 1415-1418, 1985. Depth control designs have also combined front and rear wheels on "walking beams" or in other linked arrangements to sense the average soil surface elevation and control the depth of planting in relation to that average elevation. The "linked-wheels" depth control concept reported by Morrision and Gerik (1985) citation supra is an example of this type design. While such prior art planter or drill opener unit depth control systems react to an interaction between vertical forces (e.g. weight of the furrow opener assembly, added ballast, variable down pressure of springs, the variable weight of seed or granular products in attached hoppers, etc.) and chosen depth controls, they suffer from the drawback of excess vertical forces (forces not required for furrow opening and closing) being supported by the depth control mechanisms and thereby causing wheel sinkage and row area soil compaction.

Also it is known in the prior art to utilize downpressure springs to transfer a portion of the main machine frame weight to the individual furrow opener units. However, if the downpressure of the spring is adjusted for adequate furrow opening in high resistance cutting condition, then undesirably high downpressure forces will be applied on portions of the field having lower cutting resistance, resulting in excessively deep planting.

SUMMARY OF THE INVENTION

It is the principle objects of the instant invention to provide an apparatus which avoids the aforementioned drawbacks of the prior art, while automatically and continuously controlling the depth of soil penetration of a ground contact implement (GCI), such as a means for planting, furrow opener means, seeding means, tilling means, means for applying fertilizer or pesticide, means for plowing, or any combination of the foregoing contact implements, etc.

It is also an object of the present invention to permit excess vertical forces to be supported by the machine transport wheels, with transference of such vertical force to the GCI only as needed (e.g. where said GCI is a planter, force is needed only to: (1) cut residue and open the furrow(s) to the desired planting depth; (2keep the depth gauging wheel(s) in contact with the soil surface as said gaging wheel(s) pass over undulations in the soil surface; and (3) effectively close the seeded furrow), thereby avoiding undesirable control wheel sinkage and soil compaction.

It is another object of the present invention to provide imporved planter performance under no-tillage conditions (e.g. requiring operation on rough soil surfaces, crop residues and anchored crop stubble).

These and other objects, which will become readily apparent from the ensuing description, are accomplished by use of:

a frame (e.g. a main frame and cooperating support elements);

at least one depth gaging wheel, which may include front and/or rear depth gauging wheel assemblies (each assembly including one or more (preferably two) wheels);

mounting means (which may include first and second mounting means) for connecting the at least one depth gaging wheel to the frame so that, (1) said at least one depth gauging wheel may rotate as it travels over the soil surface, and (2) the at least one depth gauging wheel may translocationally move with respect to the frame. as for example be being connected by linkage or a sub frame which is moveably (e.g. pivotably) connected to the frame, thereby permitting the at least one depth gauging wheel to translocationally move with respect to the frame with movement (e.g. pivoting) of the linkage or sub frame;

at least one GCI (such as a planter, furrow opener, seeder, tiller, fertilizer or pesticide applicator, plow, or any combination of the foregoing, etc.) connected to said frame;

an adjustable (e.g. hydraulic or pneumatic) downpressure means connected to the frame for applying an adjustable amount of downpressure in order to vary the position of the at least one GCI with respect to said at least one depth gauging wheel (and consequently vary the soil pentration depth of said GCI); and controls means operably connected to the the adjustable hydraulic or pneumatic downpressure means, for adjusting the downpressure exerted by said adjustable downpressure means in response to translocational movement of said at least one depth gauging wheel or wheel assembly and its mounting means with respect to either, (1) said frame, or (2) the other of said depth gauging wheel assemblies and its mounting means, so as to maintain substantially constant the difference in relative elevations of said at least one GCI and said at least one depth gauging wheel; said control means may for example include adjustable control means cooperating with a 3way valve to adjust the amount of hydraulic fluid or gas within the adjustable downpressure means.

DESCRIPTION OF THE PREFERRED EMBODIMENTS

Figure 1:
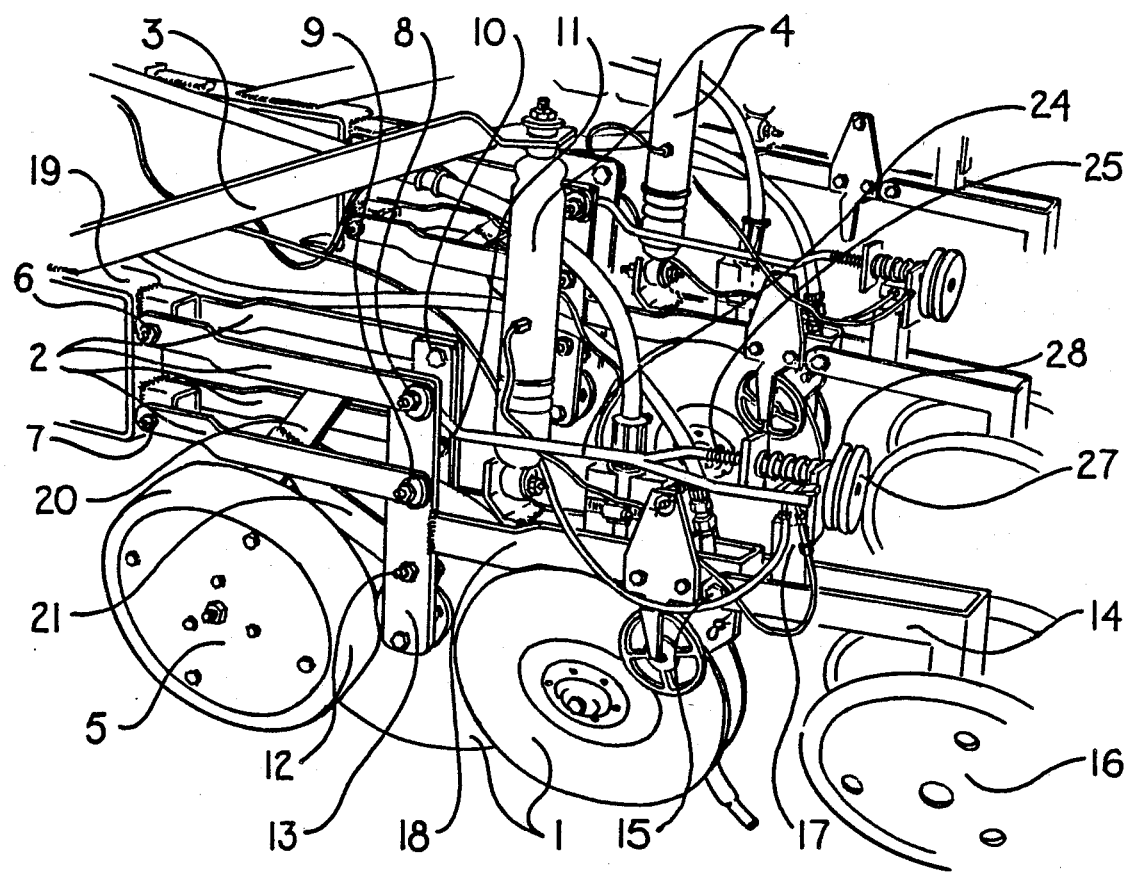
FIG. 1 shows a side view of an embodiment of the present invention including both front and rear depth gauging wheels.
Figure 2:
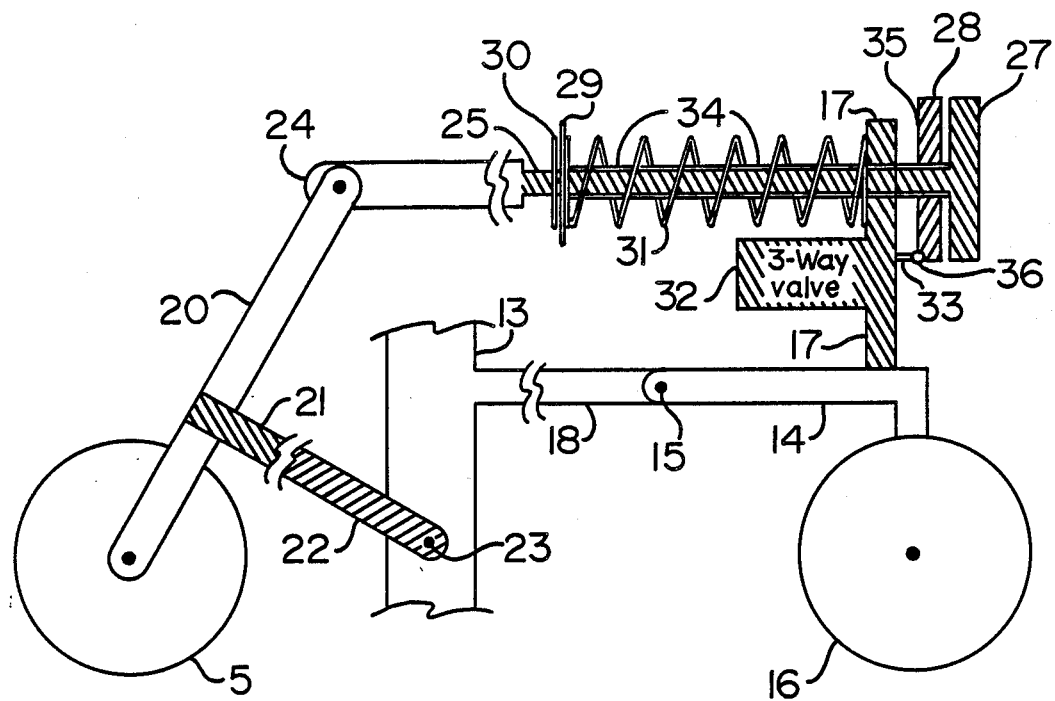
FIG. 2 shows a schematic cut-away side view showing only a portion of the internal structure of the device of FIG. 1.

The embodiment of the present invention shown in FIG. one is an interactive pneumatic row-crop planter with depth control having: (a) front and rear depth gauging wheels, (b) a pneumatic down pressure actuator, and (c) a triple-disc furrow opener, for each individual row of the planter (the planter having one or more rows). Although the device is shown with a furrow opener, it may be utilized with any ground contact implement, including for example a seeder, tiller, fertilizer or pesticide applicator, plow, etc. As viewed in FIG. 1, the planter during use would be motivated (as for example by being pulled behind a tractor) to move across a soil surface from right to left. The device includes an elongated substantially horizontal main frame 18 including an upright frame portion 13. Pivotably mounted by bolt 15 to the rear of the main frame 18 is an elongated substantially horizontal sub frame 14 carrying: (a) an upwardly extending sub frame strut 17; and (b) a rear depth gauging wheel assembly 16, which includes one or more wheels (preferably, two adjacent side-by-side wheels tilted with respect to each other so that their bottom most portions are closer to each other than their top portions). Mounted beneath said main frame 18 and upright frame portion 13 is a triple-disc furrow opener assembly designed 1, including a forward coulter, the trailing portion of which is straddled on either side by a disc. Such a triple-disc furrow opener assembly may be of the structure disclosed in: U.S. Pat. No. 4,141,302 (2/27/79, to Morrison), or U.S. Pat. No. 4,090,456 (5/23/78, to Morrison), or Morrison and Gerik, Trans. ASAE, Vol. 26, No. 4, pp. 1044-1045, 1983, or Vol. 28, No. 5, pp. 1415-1418, 1985. The device is shown mounted on a tool bar mounting bracket 19 by means of a well known type of linkage i.e. a set of four parallel links designated 2, pivotably attached at their front by bolts 6 and 7, and pivotably attached at their rear by bolts 8, 9, 10 and 11 to the upright frame portion 13. The tool bar mounting bracket also includes a tool bar mounting bracket arm 3 extending diagonally upward and rearward over the frame. A pneumatic actuator (PA), for example: an inflatable air bag (e.g. an inflatable bladder) such as those commonly utilized in truck, bus and recreational vehicle suspensions; or as shown in FIG. 1 a Monroe Max-Air 48793 single-action automotive pneumatic schock absorber (sometimes referred to as an "air-shock") designated 4, which provides variable downpressure, is connected to the end of said tool bar mounting bracket arm 3 and to the main frame 18. The PA 4 is positioned between the tool bar mounting bracket arm 3 and the furrow opener assembly 1, so that when the PA is inflated (pressurized) with pressurized fluid e.g. air, a vertical force (downpressure) is applied to the furrow opener assembly 1 to force its penetration into the soil. The embodiment illustrated in FIGS. 1 and 2 includes, a front depth gauging wheel assembly 5 (which includes one or more wheels, and may preferably include two adjacent side-by-side coaxial wheels) positioned ahead of the furrow opener assembly 1, mounted on a strut 20 which extends from said front depth gauging wheel assembly rearwardly and upwardly (at an angle of about 30 degrees from horizontal). A central portion of strut 20 has rigidly secured thereof (as for example by welding) a pair of parallel arms, which extend rearwardly and downwardly to the upright portion of the frame 13, where they are pivotably secured. FIG. 1 shows the left arm 21 pivotably connected to the upright portion of the frame 13 by bolt 12 (the right arm being largely obscured in FIG. 1 by the linkage and frame). FIG. 2 shows a portion of the device cut-away to more clearly show the right arm 22 pivotably connected to the upright portion of the frame 13 by a bolt 23. The uppermost portion of strut 20 is pivotably secured to a connecting link 24 which extends substantially horizontally toward the rear of the device. The connecting link 24 defines a threaded portion 25 at a rearward section thereof. On said threaded portion is mounted a hand wheel 27 having an internally threaded cylindrical sleeve 34, which may be turned on said threads to be moved forwardly or rearwardly on said connecting link threads 25. A cam wheel 28 with a cam surface 35 on its left hand face is rigidly secured to the hand wheel 27. To the left of the cam wheel 28 is the upper most portion of the subframe strut 17. The sleeve 34 passes through a hole in the upper most portion of the subframe strut 17, with sufficient tolerance therebetween to allow movement of the strut relative to the sleeve. A snap ring 30 holds a washer 29 at the left end of the hand wheel sleeve 34. A coil spring 31 extends over the sleeve 34 and is compressed between the washer 29 and the strut 17. The spring 31 may for example have the following structure: 8.3 cm free length, 3.8 mm wire diameter, 72 coil/meter of length and a 5.7 cm assembled length. The subframe strut 17 carries a 3-way valve 32, such as a Festo R-3-M5 (Festo Corp., Dallas, TX) three position pneumatic switch, having a valve actuator or spool (VAOS) 33 extending outwardly against the cam surface 35 of the cam wheel 28. The VAOS 33 may have a cam roller 36 (at the outermost portion of the VAOS) which rest against the cam surface 35.

Figure 3:
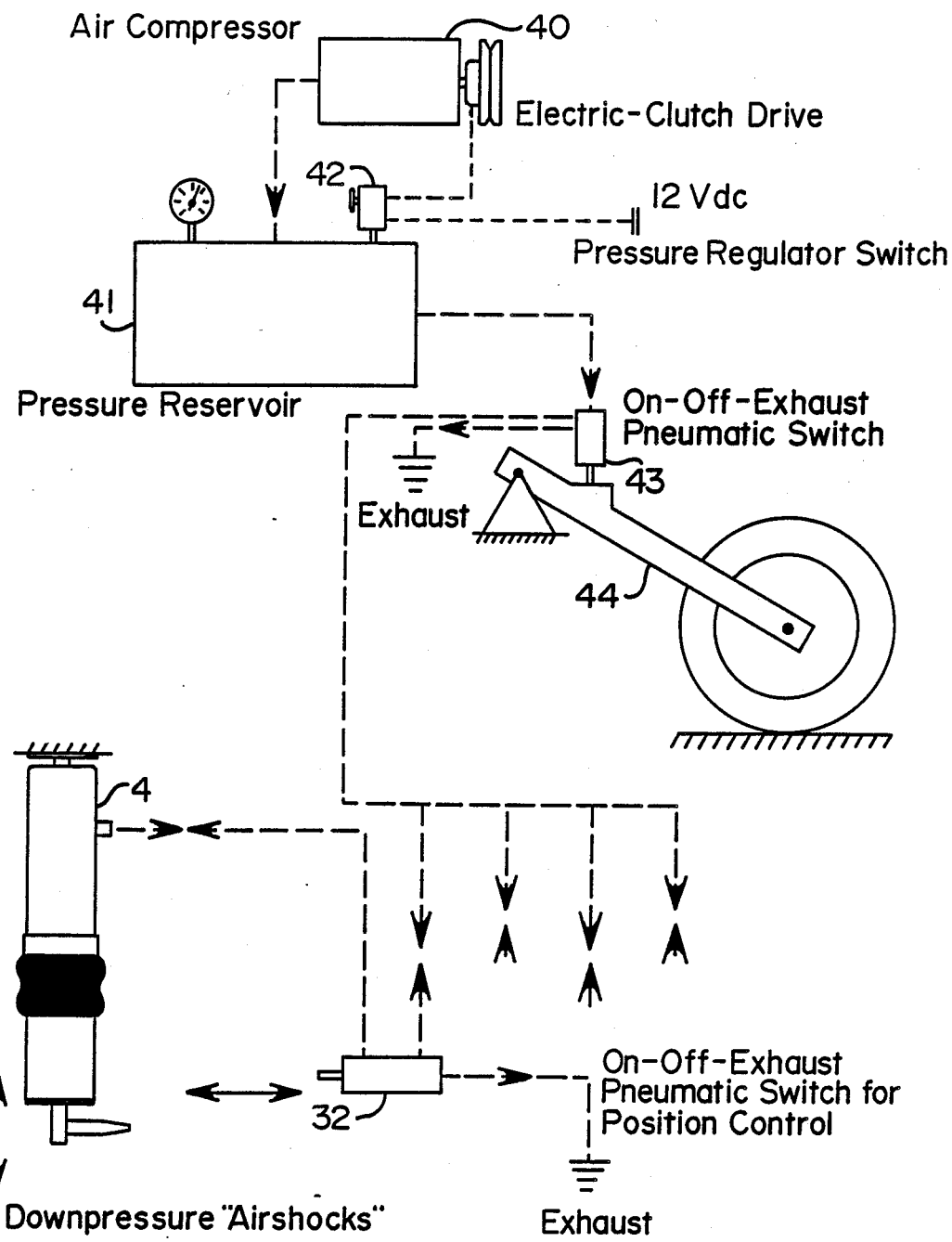
FIG. 3 is a schematic representation of the pneumatic control system of the present invention.
Figure 6:
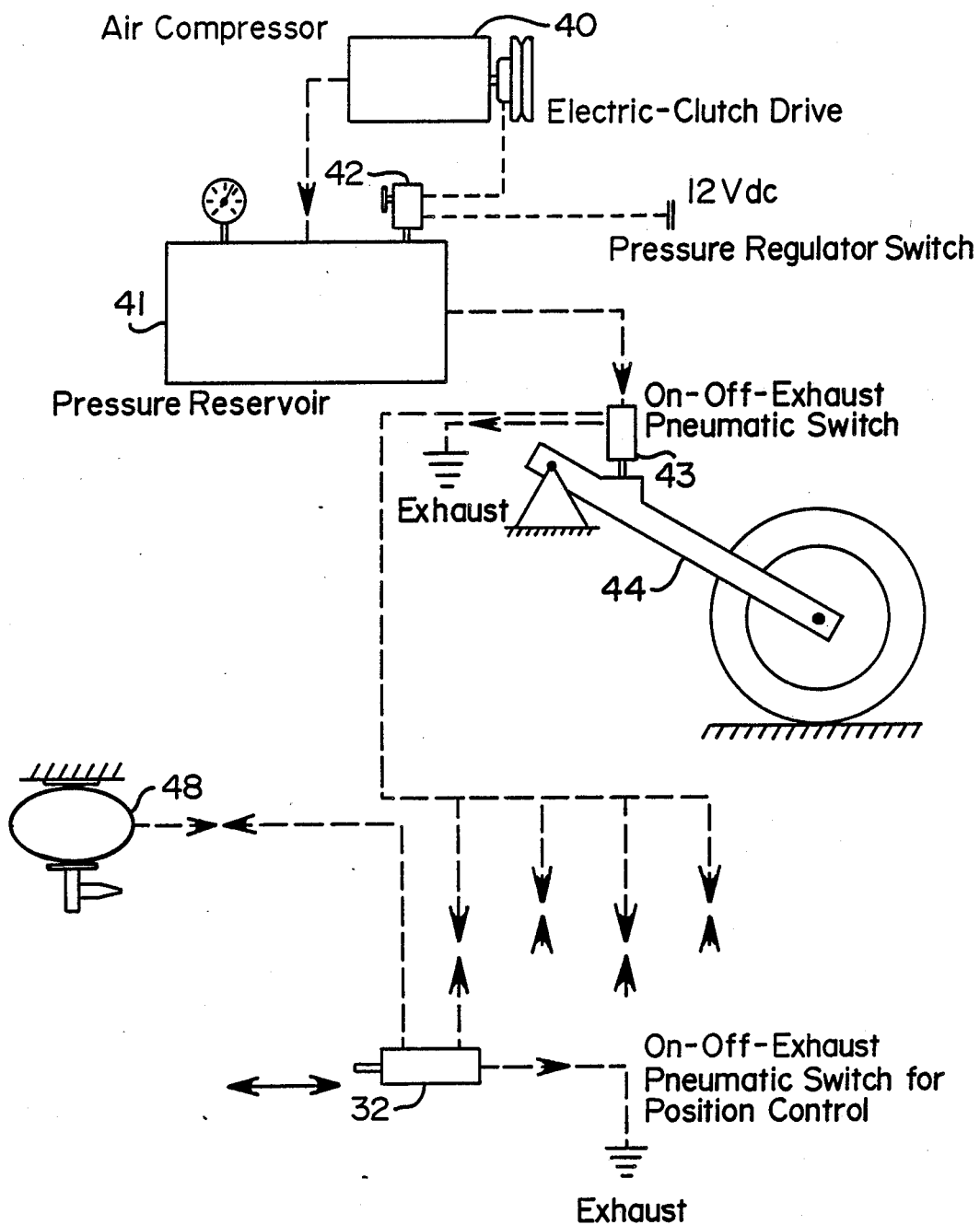
FIG. 6 is a schematic representation of a pneumatic control system of the present invention: identical with the system of instant FIG. 3, except for the substitution of a conventional inflatable bag for the downpressure airshocks.

FIG. 3 is a schematic illustration of a pneumatic control system (employing air or other gas) which may be utilized with the device shown in FIGS. 1 and 2. Although for purposes of illustration only, FIG. 3 depicts a pneumatic control system, the present invention may of course instead employ a similar control system using hydraulic fluid. FIG. 3 shows a compressor 40 which pumps gas into a pressure reservoir 41. A pressure regulator 42 is positioned on the pressure reservoir 41. The pressure regulator 42, which may for example be a 12 volt (dc) Square D 9013GHG pressure regulator (Square D Co., Ashville, N.C.), senses pressure within the reservoir, and maintains an appropriate preselected pressure by cycling the compressor 40 on and off i.e. by controlling the compressor on-off switch. The pressurized air is conducted through an on-off-exhaust 3-way pneumatic switch i.e. valve 43 (which may be example be a three position Festo V/0-3-1/8 pneumatic switch, Festo Corp. Dallas, TX) mounted on the planter frame transport wheel strut 44, so that air delivery to the planter units is interrupted when the machine is raised for transport. When the device is raised for transport, pneumatic switch 43 also functions to exhaust pressured air from all of the pneumatic control system beyond pneumatic switch 43. When the main frame of the planter is down (i.e. in operating position) pneumatic switch 43 permits compressed air to pass to 3way valves 32, which are in turn connected to pneumatic actuators 4. Although for simplification of illustration, FIG. 3 shows only one valve 32 and PA 4, it is of course understood that one such valve 32 and one such pneumatic actuator 4 are provided for each row of the planter. FIG. 6 shows a system identical with the system of instant FIG. 3 except for the substitution of a conventional inflatable bag 48 for the downpressure airshocks 4.

Before operation of the device, pressurized air is conducted from air compressor 40, through reservoir 41, pneumatic switch 43, each of the valves 34, to each of the pneumatic actuators 4. The hand wheel 27 of each row of the planter is turned on threads 25 (i.e. to move the hand wheel 27 and cam wheel 28 to the right or left as viewed in FIG. 2) to adjust the device for the desired vertical position of the furrow opener assembly (e.g. depth of planting). The dynamic forces of the device (e.g. the forces produced by the pneumatic actuator 4 and spring 31) cooperate to position the cam wheel cam surface at an intermediate distance from the 3-way valve 32, whereby the VAOS 33 is in an intermediate position which does not permit communication between the PA 4 and the remainder of the pneumatic system, and thereby traps gas within the PA. Gas trapped within the PA (when the valve actuator or spool 33 is in its itermediate position) may expand and contract to a small extent, as a result of expansive (tensile) and compressive forces exerted on the PA, thereby permitting the PA (and the entire device) to dynamically respond to said forces, allowing the individual furrow opener units to vertically float relative to machine frame movements and soil undulations without activation of the pneumatic switch 32. As the device is moved across the soil surface during planting both front and rear depth gauging wheel assemblies are normally in contact with the soil surface, consequently the soil penetration depth corresponds generally to the difference in relative elevation between the lowermost portions of the GCI and the depth gauging wheel assemblies. Typically the rear depth gauging wheel assembly will function to close the furrow. The front and rear depth gauging wheel assemblies will encounter unevenness in the soil surface. For example, when such unevenness causes the front depth gauging wheel assembly 5 to be raised relative to the main frame 18, this raises strut 20 (i.e. the front depth gauging wheel assembly 5 and the strut 20 pivot with respect to the main frame 18, which is a translocational movement (e.g. as though every point of each object has moved paralleled to, and the same distance as, every other point of that object e.g. in contrast to and distinct from rotational movement of a wheel of the wheel assembly around its own axis) of said wheel assembly and strut with respect to said frame). This movement of strut 20 causes connecting link 24 to move rearwardly against the force of spring 31, thereby moving cam surface 35 of the cam wheel 28 away from the 3-way valve 32, and permitting the VAOS 33 to move from its normal intermediate position to an extended position, (i.e. a detecting of said translocational movement) which allows air in the PA to be vented to exhaust. This permits contracting or shortening of the PA with consequent diminishing of the height difference between the wheels and the furrow opener assembly 1. Conversely, when such soil surface unevenness causes the front depth gauging wheel assembly 5 to be lowered relative to the main frame 18, this lowers strut 20, (i.e. the wheel assembly and the strut move translocationally lower) which causes connecting link 24 to move forwardly (with the force of spring 31), thereby moving the cam surface 35 of the cam wheel 28 closer to the 3-way valve 32, and thereby pushing the VAOS 33 from its normal intermediate position (i.e. a detecting of said translocational movement) to a retracted position. In its retracted position the valve actuator or spool 33 permits compressed air to enter the PA 4, thus expanding the PA and lowering the furrow opener assembly 1 (i.e. readjusting the difference in relative elevation between the wheel assembly and the furrow opener assembly 1 to the preset desired valve).

When such unevenness cause the rear depth gauging wheel assembly 16 to be translated upwardly (i.e. raised) relative to the frame, the sub fram 14 pivots, in a counter clockwise direction as viewed in FIG. 2, around bolt 15, thereby pivoting the sub frame strut 17 and the 3-way valve 32 mounted thereon forwardly (i.e. to the left as viewed in FIG. 2) on the sleeve 34. This moves the 3-way valve away from the cam surface 35 of the cam wheel 28, permitting VAOS 33 to move from its normal intermediate position to its extended position (i.e. a detecting of said translocational movement). As previously indicated, in its extended position the VAOS 33 allows air in the PA 4 to be vented to exhaust, thus permitting contracting or shortening of the PA with consequent diminishing of the height difference between the wheel assemblies and the furrow opener assembly 1. Conversely, when soil surface unevenness causes the rear depth gauging wheel assembly 16 to be lowered relative to the fram, the sub frame 14 pivots in a clockwiae direction as viewed in FIG. 2, around bolt 15, thereby pivoting the sub frame strut 17 and the 3-wat valve 32 mounted thereon and moving them rearward (to the right as viewed in FIG. 2). This moves the 3-way valve toward the cam surface 35 of the cam wheel 28, pushing the VAOS 33 from its normal intermediate position to a retracted position. As previously indicated, in its retracted position (i.e. a detecting of said pivoting movement) the VAOS 33 permits compressed air to enter the PA 4, thus expanding the PA 4 and lowering the furrow opener assembly 1 (i.e. readjusting the difference in relative elevation between the wheel assemblies and the furrow opener assembly 1 to the preset desired value). Although the forgoing, for simplicity, separately describes the raising and lower of the depth gauging wheel assemblies and consequent results thereof, it should be understood that raising or lower of the front and rear depth gauging wheels may occur randomly and/or simultaneously, and that the controls of the present invention continuously react to such random and/or simultaneous depth gauging wheel movements to maintain the preselected seeding depth.

Figure 4:
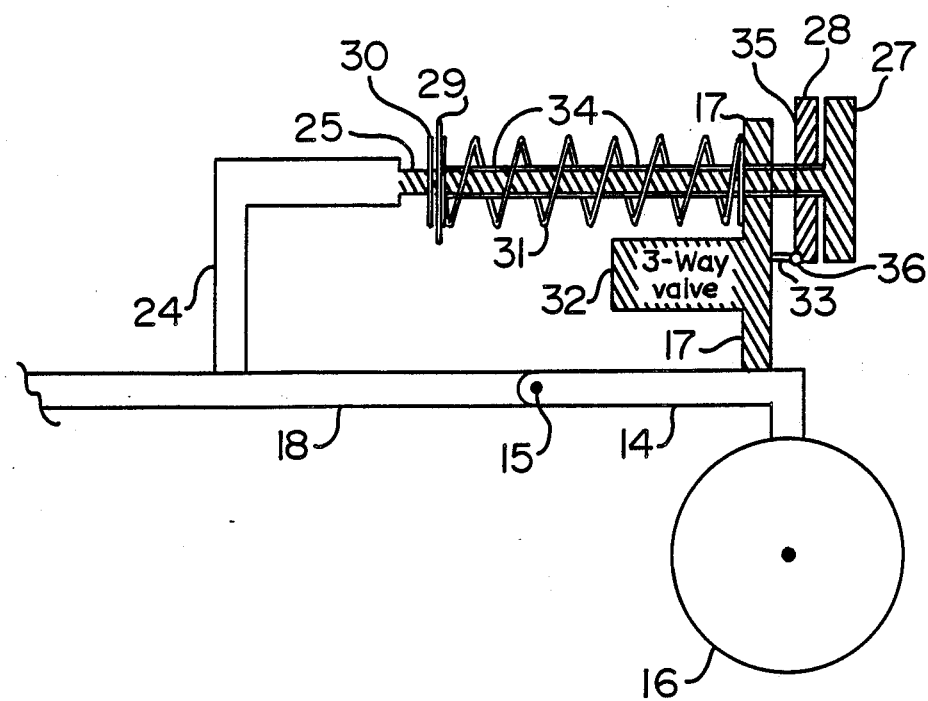
FIG. 4 is a schematic cut-away side view of a second embodiment of the present invention which may utilize only one depth gauging wheel assembly, e.g. at the rear of the device.

FIG. 4 illustrates a second embodiment of the present invention, which differs from the embodiment shown in FIGS. 1 and 2 in that: (1) link 24 is rigidly connected to the main frame 18 rather than the strut; and (2) only one (e.g. rear) depth gauging wheel assembly (rather than a pair of depth gauging wheel assemblies), including one or more wheels, is required (although additional supports and/or supporting wheels may be provided to support the device). FIG. 4 contains many of the same apparatus elements as are shown in FIGS. 1 and 2, and utilizes the same numerals to identify like apparatus elements shown in FIGS. 1 and 2. The apparatus of FIG. 4 is utilized with a pneumatic control system and PA, such as is illustrated in FIG. 3. The apparatus of FIG. 4 operates to maintain the preselected seeding depth, in the same manner described hereinabove in regard to the rear depth gauging wheel assembly 16 (and moving apparatus elements connected thereto) of the embodiment of FIGS. 1 and 2 (e.g. moving the sub frame strut 17 and valve 32 mounted thereon, relative to both the cam wheel 28 and cam wheel cam surface, so that the VAOS 33 is moved between retracted-intermediate-extended positions, so as to adjust the amount of fluid (e.g. air) within PA 4 and thereby adjust seeding depth).

Figure 5:
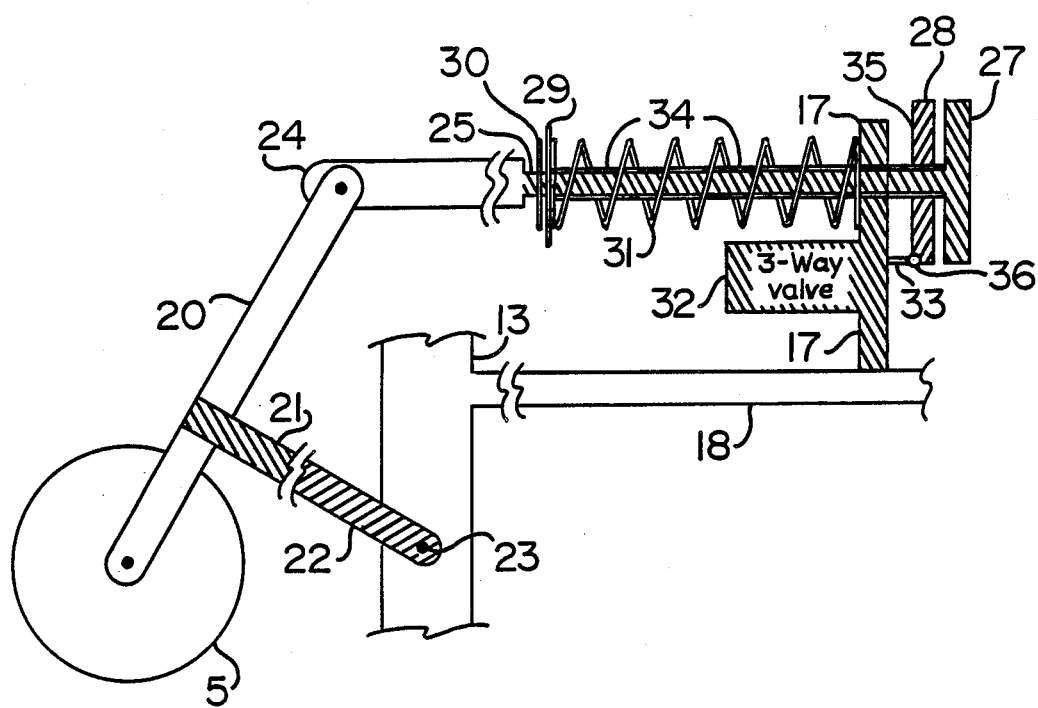
FIG. 5 is a schematic cut-away side view of a third embodiment of the present invention which may utilize only one depth gauging wheel assembly, e.g. at the front of the device.

FIG. 5 illustrates a third embodiment of the present invention, which differs from the embodiment shown in FIGS. 1 and 2 in: (a) not requiring a sub frame with connected depth gauging wheel asembly (i.e. gauging depth using only one (e.g. front) depth gauging wheel assembly (although additional supports and/or supporting wheels may be provided to support the device) and; (b) utilizing a main frame strut 47 directly rigidly connected to the main frame 18. FIG. 5 shows many of the same apparatus elements as are shown in FIGS. 1 and 2, and utilizes the same numerals to identify like elements shown in FIGS. 1 and 2. The apparatus of FIG. 5 may also utilize a pneumatic control system and PA, such as the system illustrated in FIG. 3. The device of FIG. 5 operates to maintain the preselected seeding depth, in the same manner described hereinabove in regard to the front depth gauging wheel assembly 5 (and moving apparatus elements connected thereto) of the embodiment of FIGS. 1 and 2 (e.g. moving the hand wheel 27, cam wheel 28, and cam wheel cam surface, toward or away from the valve 32, so that the VAOS 33 is moved between retracted-intermediate-extended positions, so as to adjust the amount of fluid (e.g. air) within PA 4 thereby adjust seeding depth).

It is understood that the foregoing detailed descriptions are given merely for illustration and that modifications may be made therein without departing from the spirit and scope of the invention.

INDEX OF APPARATUS ELEMENTS DESIGNATED BY A NUMERAL 1 furrow opener assembly
2 links
3 tool bar mounting bracket arm
4 pneumatic actuator
5 front depth gauging wheel assembly
6–12 bolts
13 upright portion of the frame
14 subframe
15 bolt
16 rear depth gauging wheel assembly
17 subframe strut (Index cont.)

18 main frame
18 tool bar mounting bracket
20 strut
21 left ram
22 right arm
23 bolt
24 connecting link
25 threads
27 hand wheel
28 cam wheel
29 washer
30 snap ring
31 spring
32 3-way valve
33 valve actuator or spool (VAOS)
34 hand wheel sleeve
35 cam wheel cam surface
36 cam roller
40 air compressor
41 presseur reservoir
42 pressure regulator
43 on-off-exhaust pneumatic switch
44 planter frame transport wheel strut
47 main frame strut
48 inflatable bag

Having thus described my invention, I claim:

1. An apparatus comprising:
a frame;
at least one depth gauging wheel;
mounting means connecting said at least one depth gauging wheel to said frame so that said at least one depth gauging wheel is both translocationally movable with respect to said frame and rotatable;
at least one ground contact implement connected to said frame;
adjustable downpressure means connected to said frame for varying the position of said at least one ground contact implement with respect to said at least one depth gauging wheel in response to changes in downpressure;
control means, operably connected to said mounting means and said frame and said adjustable downpressure means, for detecting translocational movement of said at least one depth gauging wheel and mounting means with respect to said frame and for adjusting downpressure exerted by said adjustable downpressure means in response to said detected translocational movement of said at least one depth gauging wheel and mounting means with respect to said frame so as to maintain a substantially constant difference in relative elevations of said at least one ground contact implement and said at least one depth gauging wheel;
wherein said mounting means includes a subframe connected to said at least one depth gauging wheel and pivotably connected directly to said frame;
a subframe strut, figidly connected to said subframe and connected to said control means;
a connecting link, rigidly connected to said frame, and connected to said control means; and
further comprising a spring flexibly linking said subframe strut to said connecting link.

2. The apparatus of claim 1 wherein said at least one depth gauging wheel includes two adjacent depth gauging wheels connected to said subframe.

3. An apparatus comprising:
a frame;
at least one depth gauging wheel;
mounting means connecting said at least one depth gauging wheel to said frame so that said at least one depth gauging wheel is both translocationally movable with respect to said frame and rotable;
at least one ground contact implement connected to said frame;

adjustable downpressure means connected to said frame for varying the position of said at least one ground contact implement with respect to said at least one depth gauging wheel in response to changes in downpressure;

control means, operably connected to said mounting means and said frame and said adjustable downpressure means, for detecting translocational movement of said at least one depth gauging wheel and mounting means with respect to said frame and for adjusting downpressure exerted by said adjustable downpressure means in response to said detected translocational movement of said at least one depth gauging wheel and mounting means with respect to said frame so as to maintain a substantially constant difference in relative elevations of said at least one ground contact implement and said at least one depth gauging wheel;

wherein said mounting means includes:

a strut connected to said at least one depth gauging wheel;

first and second arms each rigidly connected directly to said strut and pivotably connected directly to said frame; and a connecting link pivotably connected directly to said strut and connected directly to said control means;

said apparatus further comprising, a main frame strut, rigidly connected to said frame, and connected to said control means; and a spring flexibly linking said main frame strut and said connecting link.

4. The apparatus of claim 3 further including two adjacent depth gauging wheels connected to said strut.

5. An apparatus comprising:

a frame;

two depth gauging wheel assemblies each including at least one wheel;

first and second mounting means each connecting one of said two depth gauging wheel assemblies to said frame so that both said depth gauging wheel assemblies are translocationally moveable with respect to said frame and rotatable;

at least one ground contact implement connected to said frame;

adjustable downpressure means connected to said frame for varying the position of said at least one ground contact implement with respect to said depth gauging wheel assemblies in response to changes in downpressure;

control means, operably connected to said first and second mounting means and said adjustable downpressure means, for detecting relative movement of said first and second mounting means with respect to each other and for adjusting downpressure exerted by said adjustable downpressure means in response to said detected relative movement of said first and second mounting means with respect to each other so as to maintain a substantially constant difference in relative elevations of said at least one ground contact implement and said two depth gauging wheel assemblies.

6. The apparatus of claim 5 wherein said second mounting means includes:

a subframe, connected to a second of said depth gauging wheel assemblies and pivotably connected to said frame.

7. The apparatus of claim 5 wherein said first mounting means includes:

a strut connected to a first of said depth gauging wheel assemblies;

first and second arms each rigidly connected to said strut and pivotably connected to said frame; and a connecting link pivootably connected to said strut and connected to said control means.

8. The apparatus of claim 7 further including two adjacent depth gauging wheels connected to said strut.

9. The apparatus of either claim 7 or 8 wherein said second mounting means includes:

a subframe, connected to a second of said depth gauging wheel assemblies and pivotably connected to said framw.

10. The apparatus fo claim 9 further comprising a subframe strut, rigidly connected to said subframe and connected to said control means.

11. The apparatus of claim 10 further comprising a spring flexibly linking said subfram strut to said connecting link.

12. The apparatus of either claim 3 or 11 wherein said control means is operably connected to a source of pressurized hydraulic fluid.

13. The apparatus of either claim 3 or 5 wherein said control means is operably connected to a source of pressurized gas.

14. The apparatus of claim 13 wherein said adjustable downpressure means is a pneumatic shock absorbing means.

15. The apparatus of claim 13 wherein said adjustable downpressure means includes an inflatable bag.

16. The apparatus of either claim 3 or 5 wherein said control means includes three way valve means.

17. The apparatus of either claim 3 or 5 wherein said at least one ground contact implement is selected from the group consisting of means for planting, furrow opener means, seeding means, tilling means, means for applying fertilizer or pesticide, or means for plowing.

18. The apparatus of claim 3 or 5 wherein said control means includes adjustable control means for adjustably setting to provide a desired value of said difference in relative elevations.

* * * * *